United States Patent [19]

Plut et al.

[11] Patent Number: 4,930,144
[45] Date of Patent: May 29, 1990

[54] RADIATION IMAGING MONITOR CONTROL IMPROVEMENT

[75] Inventors: Leonard F. Plut, Willowick; David Nicolay, Fairview Park, both of Ohio

[73] Assignee: Picker International, Inc., Cleveland, Ohio

[21] Appl. No.: 203,510

[22] Filed: May 25, 1988

Related U.S. Application Data

[63] Continuation of Ser. No. 936,470, Nov. 25, 1986.

[51] Int. Cl.$^5$ ............................................. H05G 1/64
[52] U.S. Cl. ..................................... 378/99; 358/111
[58] Field of Search .................. 378/99; 358/111, 140, 358/168

[56] References Cited

U.S. PATENT DOCUMENTS

| | | | |
|---|---|---|---|
| 4,017,679 | 4/1977 | Kemner et al. | |
| 4,355,331 | 10/1982 | Georges et al. | 378/99 |
| 4,458,267 | 7/1984 | Dolazza | 378/99 |
| 4,468,696 | 8/1984 | Stone | 378/99 |
| 4,527,197 | 7/1985 | Nolte | 358/168 |
| 4,555,728 | 11/1985 | Fenster et al. | |
| 4,574,279 | 3/1986 | Roberts | 358/140 |
| 4,590,518 | 5/1986 | Fenster et al. | 378/99 |
| 4,633,293 | 12/1986 | Powers | 358/140 |
| 4,644,395 | 2/1987 | Itou et al. | 378/99 |
| 4,677,477 | 6/1987 | Plut et al. | 378/99 |
| 4,727,362 | 2/1988 | Rackley et al. | 358/148 |

OTHER PUBLICATIONS

Brochure HR-2000 High Resolution Monitor, Manufactured by MTI.

*Primary Examiner*—Craig E. Church
*Attorney, Agent, or Firm*—Watts, Hoffmann, Fisher & Heinke Co.

[57] ABSTRACT

A radiographic imaging system and method is disclosed having improved monitor control for enhancing the flexibility of a monitor so that one monitor can perform optimally under several system operating modes. The monitor automically detects the line rate most suitable for producing an image in the selected mode. Brightness compensation is accomplished as a function of the scan line rate at which the monitor is operating. Aspect ratio of the monitor produced image is also adjusted automatically in accordance with the operating mode selected. The system incorporates monitor brightness adjustment as a function of aspect ratio as well. Where the system incorporates a video tape or disk recorder, a time constant of the monitor is adjusted to optimize the monitor's compatibility with the video data output from the recorder in response to the selection of an operating mode wherein the recorder feeds the monitor with video information.

7 Claims, 7 Drawing Sheets

RADIATION IMAGING MONITOR CONTROL IMPROVEMENT

This application is a continuation of application Ser. No. 936,470, filed 11/25/86.

TECHNICAL FIELD

This invention relates generally to multimode fluoroscopic/radiographic imaging, and more particularly to a viewing monitor control for optimizing performance of a single monitor in each of a multiple number of modes of operation.

BACKGROUND ART

Modern x-ray fluoroscopic/radiographic imaging systems include means for operating in a plurality of imaging modes. Such systems, sometimes called "x-ray suite", include a radiation source, which directs x-rays through a patient onto the input face of an image intensifier tube. The image intensifier tube converts a relatively large area of x-rays to a smaller, relatively bright visual image corresponding to the x-ray pattern emerging from the patient. A television camera views an output image from the image intensifier tube and produces a video output comprising an ensemble of signals, including video and appropriate sync signals, which collectively define the viewed pattern, and is known as a composite video signal.

The video signal from the television can be directly coupled to a viewing monitor which produces a visible image corresponding to that viewed by the television camera. Alternately, the video can be directed to various display processing components, such as digital acquisition systems and video tape or video disk recorders. Such devices store and/or process the video signals and playback the video signals to the monitor at a later time.

Such x-ray fluoroscopic/radiographic imaging systems include a "system controller" actuable by an operator to determine the mode in which the x-ray imaging system will operate. There are several such possible operating modes. In fluoroscopy, for example, the video from the camera is transmitted directly to the monitor for real time viewing. There are at least two types of fluoroscopic imaging, i.e., the standard mode and the high resolution mode. The standard mode employs a 525 line per screen image, while the high resolution mode employs a 1049 line image.

In another mode, video from the camera can be directed to a digital acquisition system for storage and later playback. In this mode, the digital acquisition system (DAS) digitizes the information, which is later reconverted to analog form for presentation to the monitor for the production of a viewable image.

In still another mode, video is directed for recording on tape or disc, for later playback. Upon playback, the tape or disc is rerun and a video output is directed to the monitor which produces the viewable image.

A problem which has arisen in operation of these multimode systems or suites is that the various modes of imaging impose different requirements on the viewing monitor for optimal imaging. This multiplicity of monitor requirements has necessitated either the provision of multiple monitors in such x-ray systems, one preset for each mode requiring different performance, or made necessary manual adjustment of a monitor prior to each change in imaging mode.

Parameters of monitor operation which must change for different operating modes are the line scan rate of the image, the aspect ratio of the image, the brightness of the image, and a time constant or delay imposed by the video input circuitry of the monitor on incoming video signals.

As mentioned above, in fluoroscopy, it is often necessary to change between 525 line and 1049 line display formats. Brightness adjustment must be made as a function of which line rate is selected. In fluoroscopy, a 1:1 aspect ratio is desirable.

Where the digital acquisition system is used as a display source, playing back reconverted digital information to the monitor for imaging, the aspect ratio of the monitor-produced image must be changed from 1:1 to 4:3. As in the case of fluoroscopy, either a 525 line or 1049 line display can be selected, depending on the degree of resolution desired. Monitor brightness must be adjusted for each change in line rate and in aspect ratio.

Where a video tape recorder or video disk recorder is used as a display source for the monitor, again, either a 525 line or 1049 line display format can be selected, depending on the degree of resolution desired. Brightness of the monitor must be adjusted as a function of the line rate. The desirable aspect ratio for modes using the video recorders as display sources is 1:1, and, if that aspect ratio represents a change, brightness must be adjusted accordingly with that variable as well. In addition, where a video recorder is used as a display source, a time delay imposed by the input circuitry of the monitor should be decreased to facilitate the display of a stable image.

In the past, these various requirements have been satisfied by the inclusion, with an x-ray system or suite, of multiple monitors, each being preset for operation in accordance with one or another of the various combinations of parameters which are called for for each of the operating modes.

For example, one system uses one monitor to display continuous fluoroscopy, an additional monitor to display images from a digital acquisition system used as a display source, and a third monitor for video recorder output. These monitors, sometimes different in size and brand, add to the cost of the system, can distract the operator by their complexity, and generally complicate the viewability of the diagnostic information. The combination of several monitors also can create a perception that a system is not well integrated due to a number of "add-ons".

DISCLOSURE OF THE INVENTION

It is an object of the present invention to consolidate monitor displays in a multimode fluoroscopic/radiographic system. A single monitor with associated control circuitry displays all required diagnostic images.

A diagnostic system constructed in accordance with the invention includes a radiation source and a camera for generating video signals representing a sensed pattern of radiation. The sensed pattern will typically provide an image corresponding to the internal structure of a patient whose condition is being diagnosed.

The system further includes a video recorder or video digitzer that can receive video signals from the camera and then present those signals to the monitor in a modified format.

A monitor is adapted to display signals directly from the camera as well as video signals that have first been stored by the video recorder or that have been digitized by the video digitizer. The monitor includes circuitry to generate synchronization signals, to adjust image brightness, to adjust the image aspect ratio, and to control the image resolution.

A system video switcher includes a programmable switch to selectively route video signals from an image source to the monitor. The controller video switcher with a user console which can be switched to a particular viewing mode. The video switcher automatically routes a video signal from a selected image source to the monitor and modifies the monitor operation to correspond to the selected viewing mode. The user does not have to adjust the monitor nor select from a number of monitors which have been previously adjusted for a particular viewing mode. The confusing and awkward systems of the prior art are obviated.

The programmable video switcher that routes video signals has a number of contacts that are closed by a programmable address decoder preferably embodied in an electronically erasable read only memory. This allows the control system to be easily reprogrammed.

Signals from the programmable address decoder also automatically configure circuitry interfacing the viewing monitor to adjust monitor operation. This circuitry automatically selects the aspect ratio and horizontal time constant of the monitor without requiring operator intervention.

Details of the different user selectable options and the affect a choice of those options has on the controller and viewing monitor are presented below where a detailed description of a preferred embodiment of the invention is described in conjunction with the accompanying drawings.

BEST MODE FOR CARRYING OUT THE INVENTION

Figure 1:
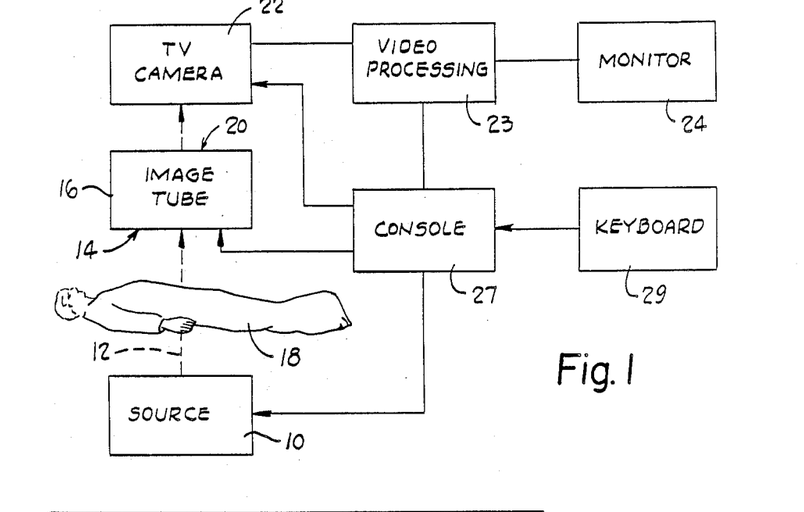
FIG. 1 is a schematic diagram illustrating image acquisition, storage, and monitoring components of a diagnostic imaging system.

FIG. 1 illustrates in generalized form a radiation imaging system incorporating the present invention. The system of FIG. 1 includes a source 10 for producing penetrative radiation, such as x-rays, which are propagated along a path 12 toward an input face 14 of an image intensifier tube 16. The image tube 16 is sufficiently spaced from the source 10 to accommodate the positioning of a patient or subject 18. X-rays from the source pass through the patient and the emergent radiation pattern is incident upon the input face 14 of the image tube 16. The image tube 16, of known variety, produces a visible light image at an output face 20 corresponding to the pattern of x-rays incident upon its input face 14.

A television camera 22 is aligned to view the image appearing at the output face 20 of the image tube 16. The television camera 22 produces an ensemble of video signals which collective define the image viewed by the camera at the output face 20 of the image tube 16.

More specifically, the television camera 22 receives light output from the output face 20 of the image tube, and produces a video signal set representing the light distribution of the viewed image along with appropriate synchronization signals. The video and synchronization signals are either transmitted directly to a monitor 24, or are transmitted indirectly to the monitor 24 by a video signal processing subsystem 23 (FIG. 1) that includes a plurality of other display sources.

The fluoroscopic/radiographic imaging system in which the present invention is incorporated includes a console 27 having a keyboard input 29 for selecting whether the video signal is transmitted directly to the monitor from the camera 22, or is transmitted to one of the plurality of other display sources in the video signal processing subsystem 23 for subsequent playback on the viewing monitor 24.

A preferred monitor 24 is a CRT type Model HRD 1240 Sierra monitor commercially available from Sierra Scientific of Sunnyvale, Calif., USA, and includes provisions for adjustment of several imaging parameters. Among the parameters of which adjustment is provided is aspect ratio, which is the ratio between the horizontal and vertical deflection, volt for volt, of the electron beam which is used to produce the image on the face of the CRT. A circuit within the monitor 24 also provides for adjusting the brightness and contrast of the image. Additionally included in the monitor is a horizontal phase lock loop (PLL) Circuit which synchronizes the horizontal deflection voltages with the horizontal sync pulses that form part of the composite video signal. An R-C circuit in the PLL circuit imposes a particular time response on incoming video horizontal information. The R-C circuit helps improve the responsiveness of the horizontal PLL to lock to horizontal sync pulses, and avoids "tearing" of the monitor image due to improper horizontal synchronization.

Figure 2:
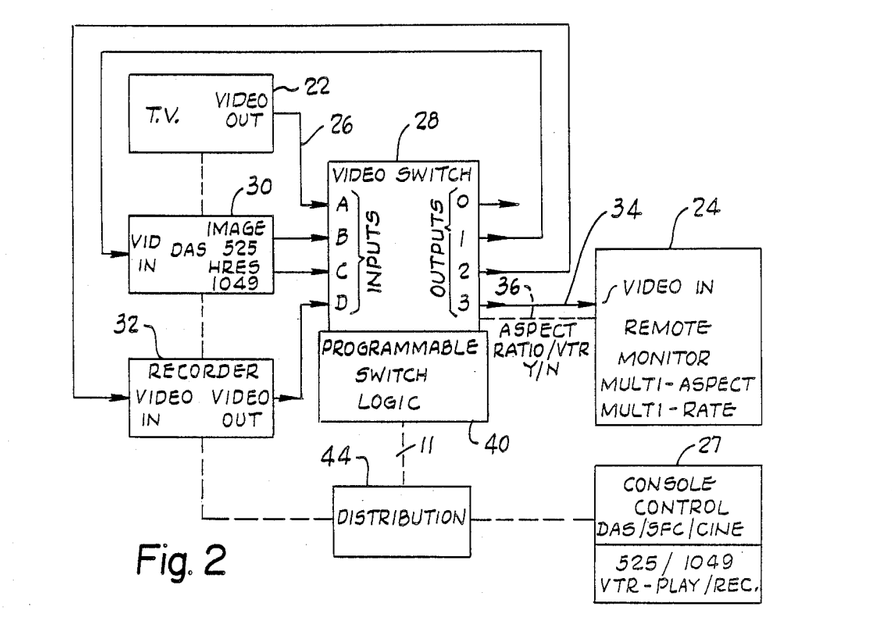
FIG. 2 is a schematic of a switch interface between multiple video signal sources and a display monitor.

FIG. 2 illustrates components of the video processing subsystem 23 interposed between the television camera unit 22 and the monitor 24. FIG. 2 illustrates the video signal from a television camera output transmitted to an input A of a multi-input, multi-output video switch unit 28. Coupled to other inputs B-D of the video switch unit 28 are outputs of other video display sources, such as two outputs of a digital acquisition system 30 and a video recorder unit 32. Some of the outputs of the switch unit 28 are coupled to inputs of the auxiliary display sources 30, 32, while one of the outputs, extending over a video signal path 34, is coupled to a video input terminal of the monitor 24.

Additionally, output signals from the video switch unit 28 are directed, over a two line opto-isolated signal path represented by the dotted line designated by reference character 36, to remote control terminals of the monitor 24.

The video switching unit, depending on the x-ray system mode of operation selected via the console 27, enables the monitor 24 to display video information from the appropriate source of video signals.

Table 1 (below) lists x-ray image viewing mode choices, and specifies the video routing (Video In and Video Out) through the video switcher unit 28 for each choice. Table 1 also specifies the aspect ratio, line scan rate, and time delay requirements of the monitor for each viewing mode of the diagnostic system.

TABLE 1

| Mode | Video In | | Video Out | Aspect Ratio | VTR Y/N | Scan Rate |
|---|---|---|---|---|---|---|
| Fluoro 525 | A | → | 3 2 | 1:1 | N | 525 |
| Fluoro 1049 | A | → | 3 2 | 1:1 | N | 1049 |
| DAS Position | A B | → → | 1 3 | 4:3 | N | 525 |
| DAS Image | A B | → → | 1 3 | 4:3 | N | 525 |
| DAS HRES | A C | → → | 1 3 | 4:3 | N | 1049 |
| VTR Play | D | → | 3 | 1:1 | Y | 525 |

The video switch unit 28 is "crosspoint" in design, which means it can connect any of its inputs to any of its outputs without video termination problems. The selection of the video path through the switch unit 28 (characterized by the "→" which connotes "connected to/-from") depends on which of the modes of operation is selected for the system. The console 27 interfaces the video processing subsystem 23 by a multiconductor cable multiconductor cable which is interfaced to a programmable switch circuit 40 by way of a system signal distribution circuit 44.

Figure 3:
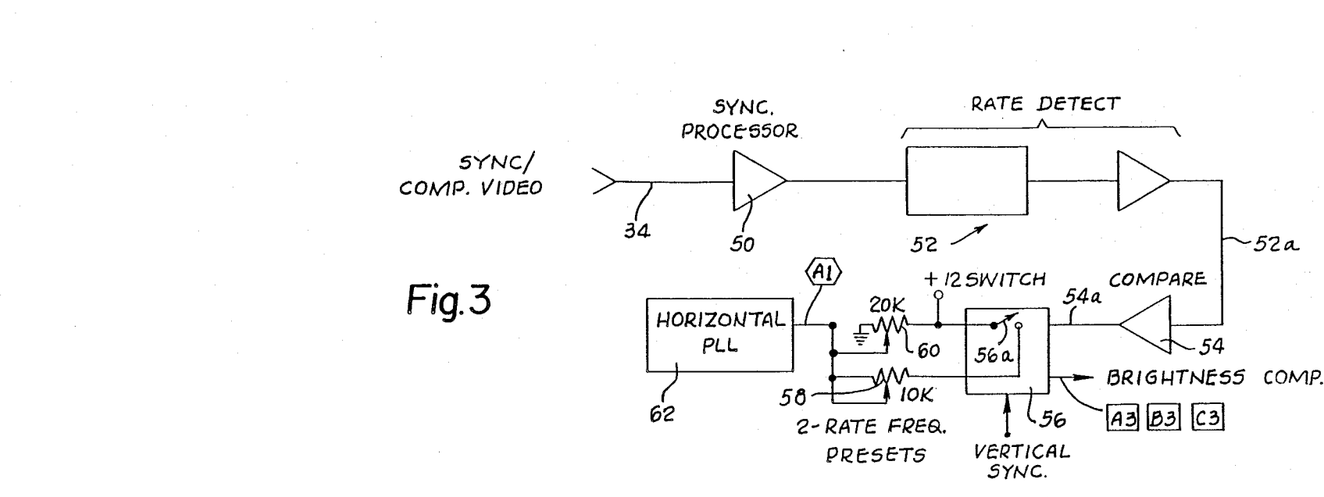
FIGS. 3 and 4 are schematic diagrams of circuitry for automatically controlling operation of the display monitor based upon a user selected viewing mode.
Figure 4:
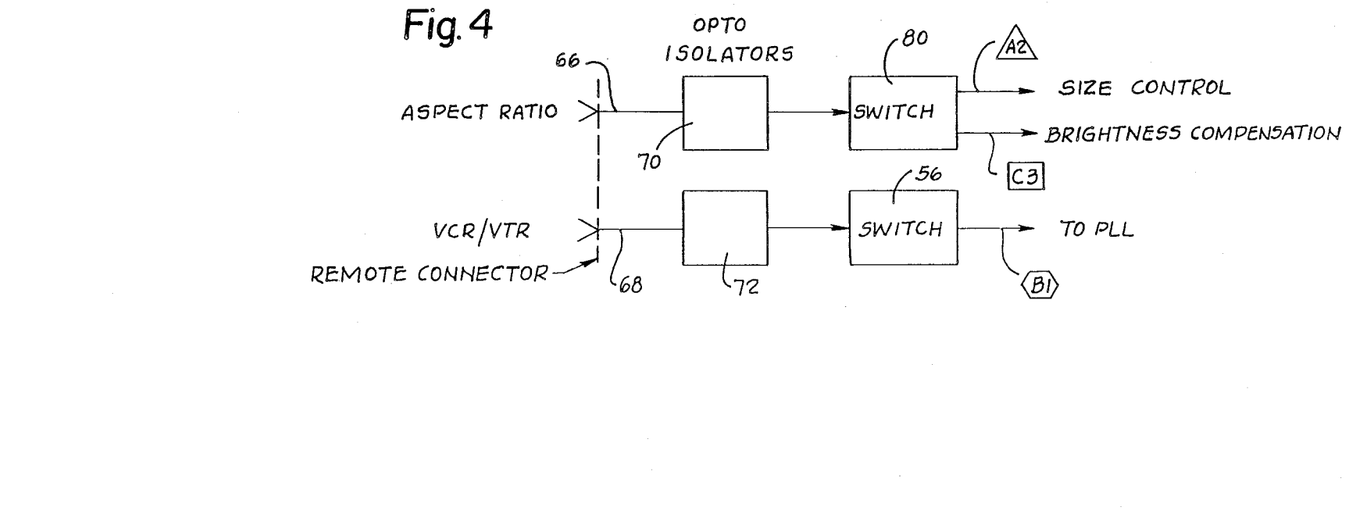

Circuitry that interfaces the monitor brightness, deflection, and phase lock loop circuits is schematically depicted in FIGS. 3 and 4. In FIG. 3 the composite video signal input 34 from the switch unit 28 is coupled to a sync processor 50 within the monitor that strips the signal of its video portion and produces a sequence of horizontal and vertical sync pulses. The rate of these pulses indicates whether the video scan rate is 525 or 1049 lines per image screen. A rate detection circuit 52 (within the monitor) generates a D.C. output sensitive to rate, 52a, coupled to a comparator 54. When the scan rate is 525 lines the D.C. level of the output 52a is higher than when the resolution is 1049 lines. A comparator output 54a goes high when the 1049 line scan mode is sensed by the rate detection circuit 52. A high output from the comparator gates an analog switch 56 closing a switch contact 56a to add a resistor 58 in parallel with a second resistor 60. The parallel combination of resistors is coupled to a monitor phase lock loop circuit 62 connection A1 to adjust a voltage of a voltage controlled oscillator (VCO) that governs the horizontal sweep frequency of the monitor.

The two signal opto-isolated path 36 of FIG. 2 is shown as two conductors 66, 68 coupled to two opto-isolators 70, 72 in FIG. 4. A high signal on the conductor 66 causes the monitor to display video information with a 1:1 aspect ratio and a low signal at the conductor 66 selects a 4:3 aspect ratio. The aspect ratio is adjusted by adding a resistor in parallel to an existing monitor resistor to increase the gain of a horizontal deflection amplifier in the monitor 24 by a factor of 4/3.

The conductor 68 carries a signal that indicates whether a time delay is imposed. When the input goes low a response time is speeded on video signals to configure the monitor for receipt of video signals from the recorder 32. This speeded up response time eliminates the known phenomena of "flagging" where the image tears at the top of the picture with video originating at the video recorder 32. When the recorder 32 is used as the video source it is necessary to speed up a time response of the monitor's horizontal phase lock loop. This is accomplished by shunting a resistor-capacitor circuit to ground.

The opto-isolator circuits 70, 72 activate gate inputs to analog switches 80, 56. One output A2 from the switch 80 is coupled to the monitor deflection circuit, a second output C3 from the switch 80 is coupled to a video preamplifier circuit and adjusts a clamp circuit reference voltage to restore monitor brightness independent of aspect ratio choice. An output B1 from the switch 56 is coupled to the horizontal phase lock loop circuit to alter the signal response of the horizontal sweep generator. Thus, a change in aspect ratio affects brightness, as well as aspect ratio and a change to the video recorder changes the time delay imposed on video signals utilized by the phase lock loop.

Figure 5:
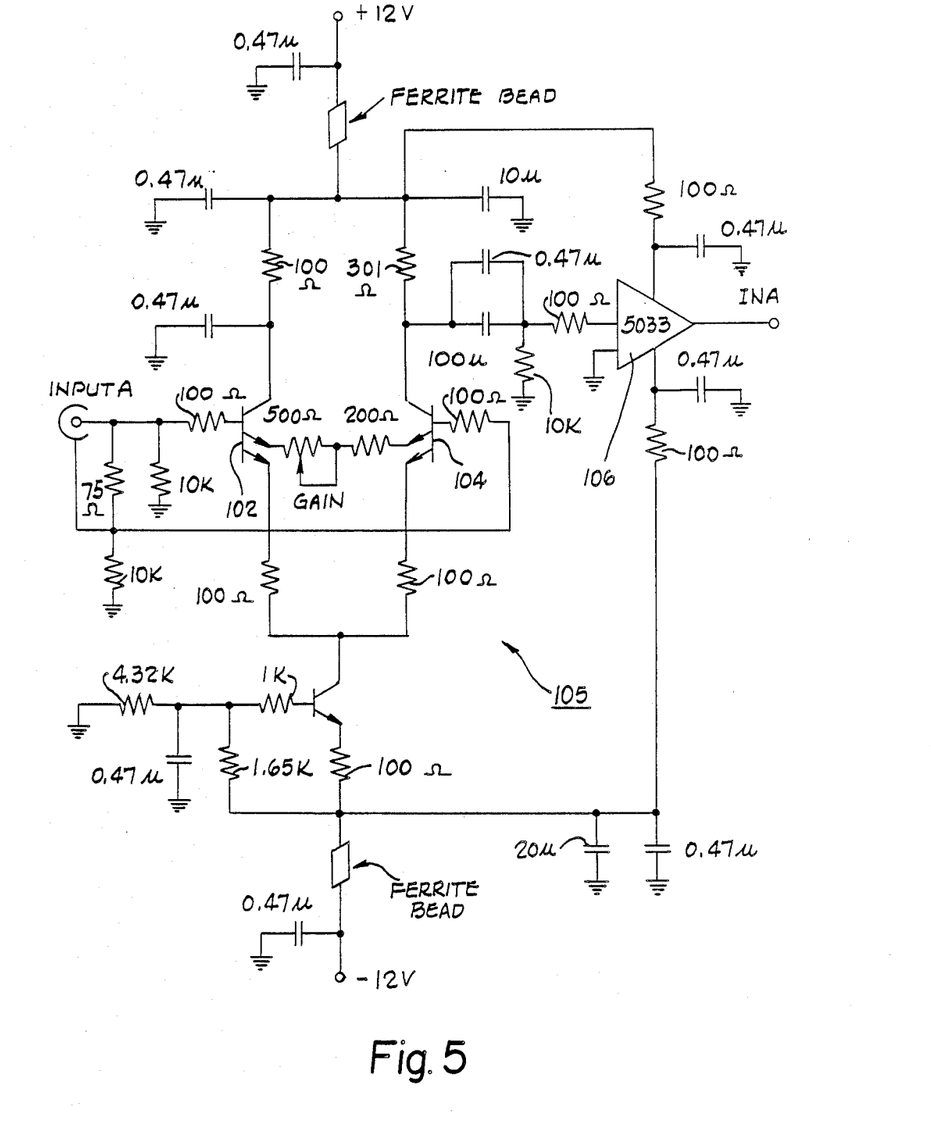
FIGS. 5-8 depict the switch interface of FIG. 2 in more detail.

Detailed schematics of the switch unit 28 and programmable switch logic 40 are presented in FIGS. 5–8. FIG. 5 illustrates an impedance matching input channel for the switch inputs A, B, C, D in FIG. 2. Each input channel includes a gain of two differential amplifier 105 having two double emitter high frequency transistors 102, 104. An output from the collector of the transistor 104 is coupled to a buffer amplifier 106 having a signal output designated IN A in FIG. 5. Although one input channel for the switch 28 is depicted in FIG. 5, it is appreciated that each of the four switch inputs A, B, C, and D is coupled to a differential amplifier circuit configuration identical to the FIG. 5 circuit.

Figure 6:
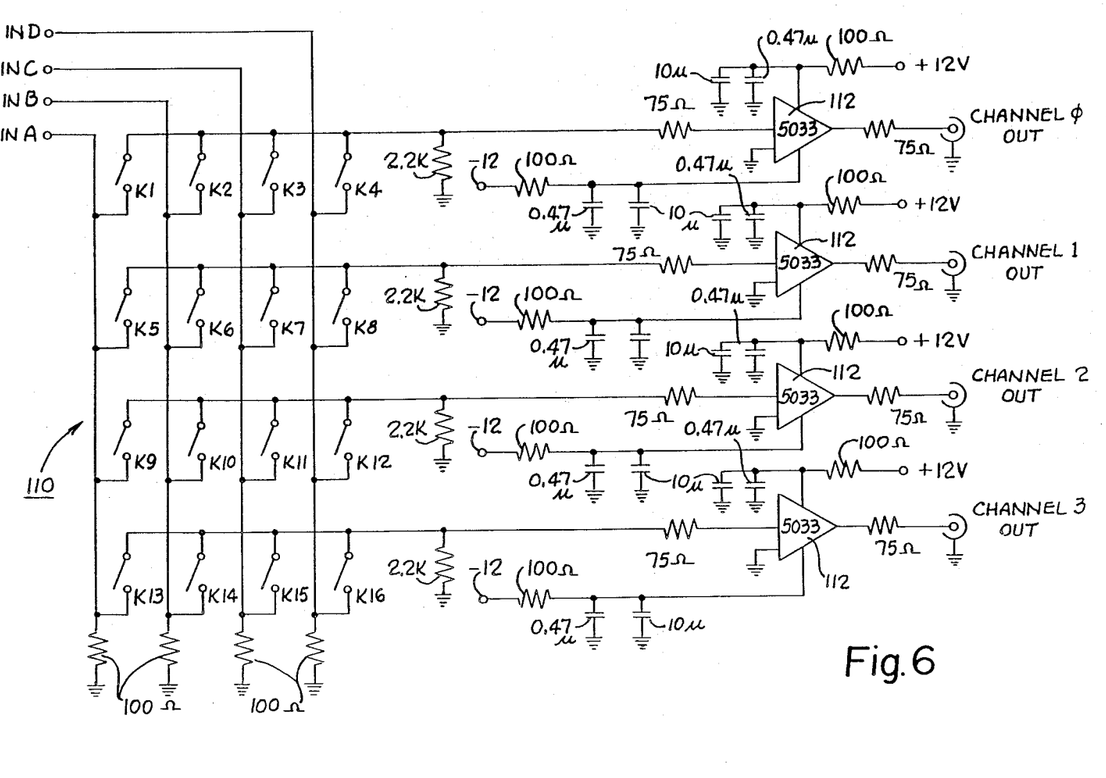

FIG. 6 illustrates an array of 16 switch contacts K1–K16 representing relay control contacts for coupling one of the signal inputs IN A, IN B, IN C, IN D to one of the four channel outputs labelled channel 0-channel 3. The array of 16 switch contacts K1–K16 forms a multiplexer 110 to controllably direct input signals at inputs A–D to output signals at the four output channels, channel 0-channel 3. Each of the four channel outputs 0–3 includes a buffer amplifier 112 interposed between its associated switch contacts and the channel output.

Figure 7:
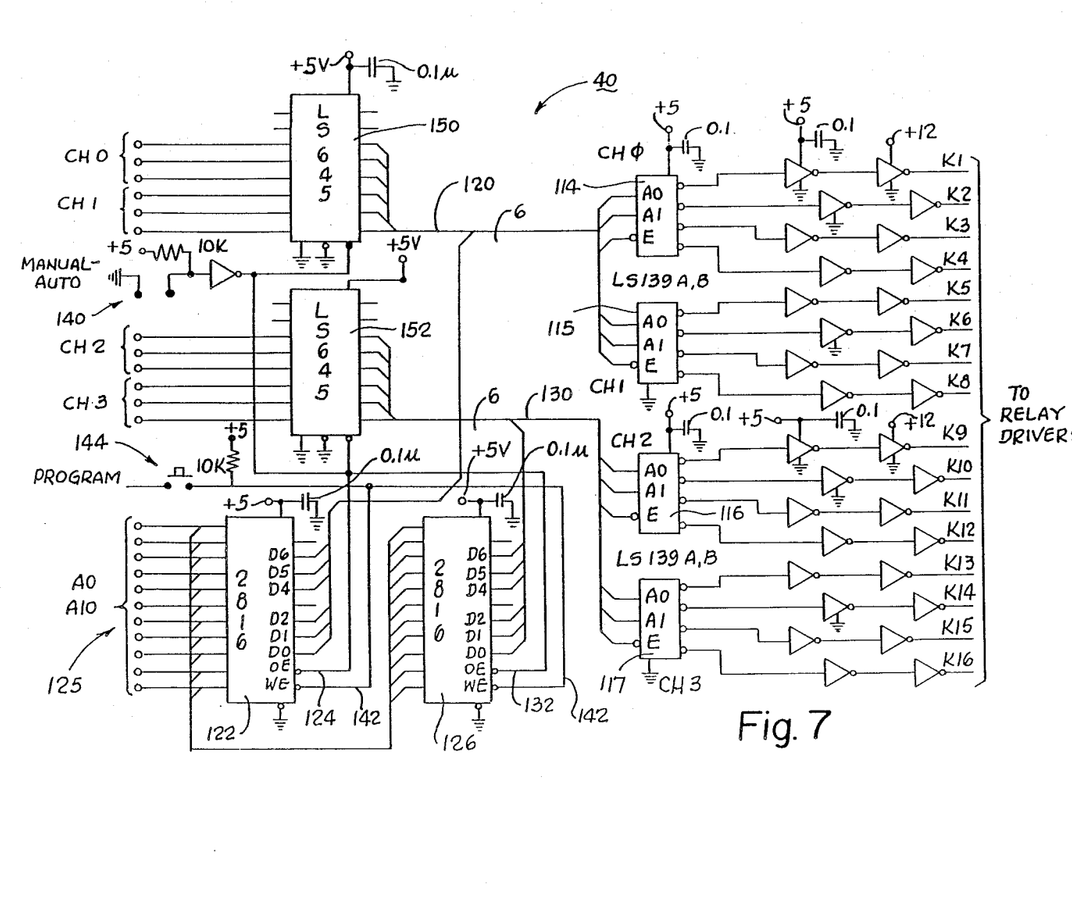

The status of the relay contacts K1–K16 (FIG. 6) is determined by the output status of relay drivers which in turn is determined by the output of a 16 line output labelled K1–K16 in FIG. 7. A series of four selector circuits 114–117 control the status of these 16 outputs. The selector circuit 114 selectively controls energization of relay coil drivers that open and close the first four relay contacts K1–K4 associated with channel output 0 (FIG. 6). In the illustrated embodiment of the invention, only one of the contacts K1–K4 is closed at a given time. The selector circuit 114 includes four outputs one for each of the contacts K1–K4. Receipt of an enable input to the selector circuit 114 asserts one of the four outputs based upon the status of two address inputs A0, A1 to the selector 114.

The operation of each of the other selector circuits 115–117 is similar. Each of these selector circuits is associated with one output channel of the switch unit 28 and in particular the selector circuit 115 closes the contacts K5–K8 associated with channel 1, the selector circuit 116 closes the contacts K9–K12 associated with channel 2, and the selector circuit 117 closes the contacts K13–K16 associated with channel 3.

The address and enable inputs to the two selector circuits 114, 115 are presented on a 6 bit data bus 120. Data is presented to the data bus 120 by six data outputs D0–D2, D4–D6 of an electronically erasable read only memory unit (EEROM) 122.

The EEROM unit 122 has a series of 11 address inputs A0–A10 and defines a 6 bit output presented on the data bus 120. During normal operation, an output enable control 124 of the EEROM 122 is rendered active so that the EEROM unit 122 presents as its data output the contents of a storage location addressed by an address bus 125 having address inputs A0–A10.

As seen in FIG. 7, a second EEROM unit 126 having a sequence of 6 outputs is tied to a second data bus 130 which controls 6 inputs to the selector circuits 116, 117. In a completely analogous fashion, whenever an output enable control 132 to to the ROM unit 126 is rendered active, the ROM unit 126 presents data onto the data bus 130 for the selector circuits 116, 117. The two output enable control inputs 124, 132 to the EEROM units 122, 126 are coupled together and are active so long as a toggle switch 140 (FIG. 7) is open.

The address signals on the address bus 125 are generated at the distribution circuit 44 so that depending upon the mode of operation a user selects via the console 27, a particular address is presented on the address bus causing the two read only memory units 122, 126 to present appropriate data for activating the switch contacts K1–K16. In the disclosed embodiment of the invention, the EEROM units 122, 126 are programmed to couple each input at input A–D (FIG. 2) to only one output at output channel 0–3 with the disclosed design, however, any interconnect combination is possible.

The toggle switch 140 (FIG. 7) is closed to reprogram the EEROM units 122, 126. If the EEROM unit 122 is to be reprogrammed, a write enable input 142 to the EEROM unit 122 must be rendered active and this is accomplished by closing a pushbutton switch 144. When this happens, the ROM unit 122, latches the data on the data bus 120 and stores it in a storage location dictated by the address bus 125. The data presented on the data bus 120 to reprogram the EEROM is controlled by inputs to a bi-directional buffer 150 which is coupled to user activated programming switches (not shown) that are manually set.

The ROM unit 126 can be reprogrammed by appropriate selection of data to the input of a second bi-directional buffer 152 that interfaces the data bus 130. The reprogrammability of the ROM units 122, 126 allows the various input/output combinations depicted in Table 1 to be changed as the diagnostic system of FIG. 1 is reconfigured.

Figure 8:
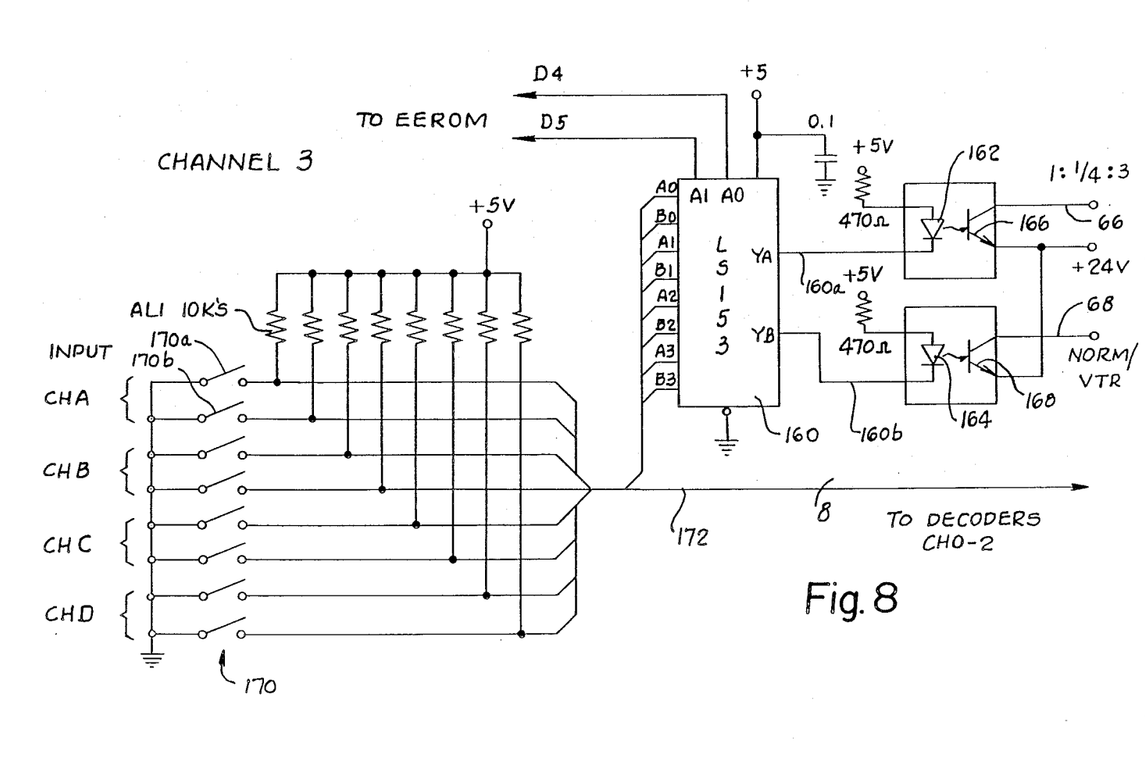

Circuitry for generating the opto-isolated aspect ratio and time constant signals is depicted in FIG. 8. The switch unit 28 includes four aspect ratio and time constant decoder circuits, one for each output channel. A representative decoder circuit 160 for channel 3 is depicted in FIG. 8. Two outputs 160a, 160b from a decoder circuit 160 controllably energize two light emitting diodes 162, 164 which turn on and off two transistors 166, 168 coupled via the conductors 66, 68 to the opto-isolator circuits 70, 72 of FIG. 4 when the channel 3 output is coupled to the monitor 24.

The status of the outputs 160a, 160b is controlled by two address inputs $A_1$, $A_0$ coupled to the EEROM unit 126 of FIG. 7 (data pins $D_4$, $D_5$) and a switch array 170 coupled to an eight bit data bus 172. The switch array 170 is organized in four groups of two switch contacts to a group. Each group of two switch contacts is associated with a particular input channel. The address inputs $A_0$, $A_1$ to the decoder 160 instruct the decoder which input channel is connected to output channel 3. When the channel A (TV camera) input is coupled directly to the monitor output of output channel 3 the aspect ratio is 1:1 and no time delay adjustment is required (See Table 1). Two switch contacts 170a, 170b of the switch array 170 are accordingly set to cause the decoder 160 to turn off the transistors 166, 168 to present high inputs to the opto-isolators 70, 72 of FIG. 4. Other appropriate switch settings in the array 170 are made to characterize monitor display characteristics when video data originates from input channels B–D.

Figure 9:
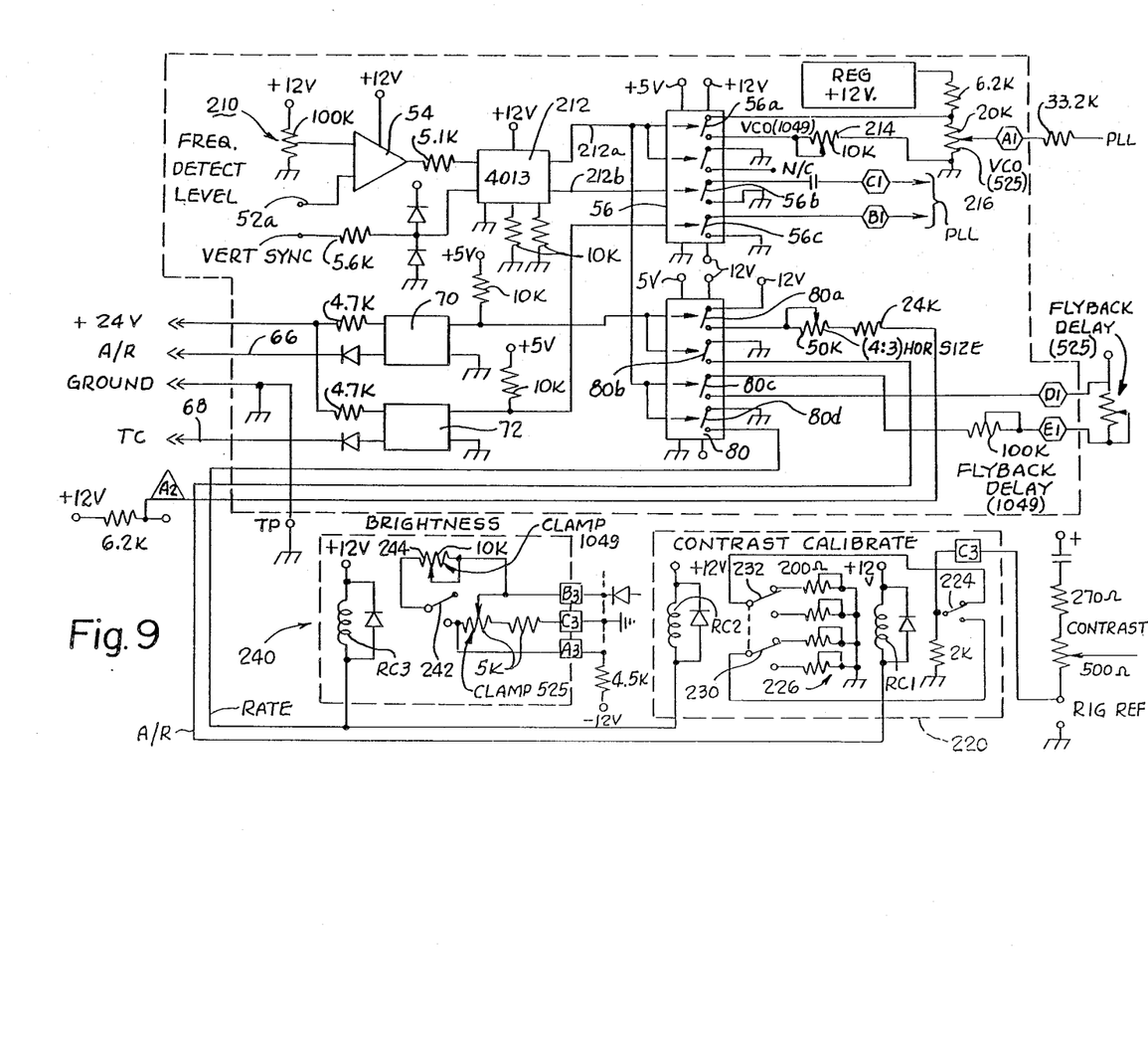
FIG. 9 is a detailed schematic of a monitor control circuit.

Details of the FIGS. 3 and 4 monitor adjustment circuitry is depicted in FIG. 9. The comparator circuit 54 has one input coupled to an output 52a from the rate detector circuit 52 and a second input coupled to a reference potential generated by a variable resistor 210. An output from the comparator 54 is coupled to a one-shot 212 that is gated by a vertical sync pulse from the monitor so that the one-shot 212 acquires the output data from the comparator 54 only during the vertical blanking period of monitor operation.

Two output signals 212a, 212b that are the complement of each other from the one-shot 212 are coupled to gate inputs that control the status of two contacts 56a, 56b of the analog switch 56. The switch contact 56a adds a resistor 214 in parallel to a second resistor 216 which controls a voltage control output in the phase lock loop circuit. This voltage control output determines the frequency of a reference oscillator and particular configures this oscillator for either 525 or 1049 lines on the monitor display. The circuit connection A1 represents a connection to the voltage control input to a phase lock loop integrated circuit SGS Brand Integrated Circuit (Part No. 1180P) of the Sierra Scientific monitor. Circuit connection C1 is controlled by switch contact 56b which is closed when contact 56a is open, and is connected to pin 14 of the PLL circuit.

A third contact 56c of the analog switch 56 is coupled to the opto-isolator 72 which determines whether the existing time response of the phase lock loop must be modified. When the signal originates from the recording device the switch contact 56c is closed and a resistor/capacitor circuit connection B1 at pin 11 of the PLL circuit is grounded so that the time response of the phase lock loop is shortened.

The output from the opto-isolation circuit 70 is coupled to a first switch contact 80a of the analog switch 80. When the contact 80a closes, an adjustable resistance is coupled to a connection A2 in the monitor horizontal deflection circuit. The contact closes in response to a low input on the conductor 66 indicating an aspect ratio of 4:3 is required. This introduces a resistor into a gain control of the horizontal deflection circuit to increase the horizontal deflection gain or horizontal size.

A switch contact 80b closes in conjunction with the contact 80a and is coupled to a contrast calibration circuit 220 having a relay coil RC1 which is energized when an aspect ratio of 4:3 is chosen. When the coil RC1 is energized a switch contact 224 is coupled to a resistor array 226 in the contrast calibration circuit 220. Two additional switch contacts 230, 232 are controlled by a second relay coil RC2 coupled to an analog switch contact 80d whose status is controlled by the output 212a from the one shot 212. As noted above, this signal 212a controls monitor scan rate, so the contact 80d and status of the resistor array 226 is controlled to compensate for contrast changes due to monitor scan rate. Additionally, a junction C3 in the contrast calibration circuit 220 is coupled to a monitor video pre-amplifier to control the gain of a video amplifier circuit.

Two additional monitor junction connections A3, B3 adjust monitor brightness. A brightness compensation network 240 includes a third relay coil RC3 energized under control of the output 80d from the analog switch contact. When energized, the coil RC3 closes a contact 242 to add a resistor 244 to the brightness compensation network 240 and thereby adjusts a clamp reference signal of the video amplifier section of the monitor to increase the brightness when the resolution changes from 525 lines per screen to 1049 lines per screen.

Table 2 listed below illustrates the four different status conditions of the relay coils RC1, RC2, RC3 depicted in FIG. 9 for different combinations of aspect ratio and monitor resolution.

TABLE 2

| | | Scan Rate | |
|---|---|---|---|
| | | 1049 line | 525 line |
| ASPECT RATIO | 1:1 | RC2 & RC3-ON RC1-OFF | RC2 & RC3-OFF RC1-OFF |
| | 4:3 | RC2 & RC3-ON RC1-ON | RC2 & RC3-OFF RC1-ON |

One additional analog switch contact 80c controlled by the output 212a from the one shot 212 changes a horizontal flyback delay of the monitor. This assures the image on the monitor screen is centered for both line formats.

The particular circuit connects A1-E1, A2 and B2, and A3-C3 are junctions the FIG. 9 circuit interfaces the Sierra Scientific monitor. It should be appreciated, however, that for other viewing monitors similar control circuitry for adjusting the operation of the monitor would be apparent from the present disclosure.

Although the present invention has been described with a degree of particularity it is the intent that the invention include all modifications and alterations from the disclosed design falling within the spirit or scope of the appended claims.

We claim:

1. A radiation imaging system comprising:
   (a) a source of penetrative radiation;
   (b) acquisition means for detecting patterns of radiation from said source and for producing a video output representing said patterns in accordance with one of a set of selectable acquisition modes;
   (c) control means for operating said acquisition means in accordance with a selected one among said set of operating modes;
   (d) a monitor including input circuitry coupled to receive said video output and means including a cathode ray tube and an electron gun to produce in raster format a visual image corresponding to said radiation patterns represented by said video output, and means for adjusting the aspect ratio of said visual image;
   (e) circuit means automatically operable on said monitor for adjusting the aspect ratio of said image acceptable by said monitor as a function of the format of said operating mode which is selected by said control means, and
   (f) circuit means for adjusting the brightness of said image as a function of the aspect ratio of said image produced by said monitor.

2. A radiation imaging method comprising the steps of:
   (a) producing penetrative radiation and passing said radiation through an object to be imaged;
   (b) detecting patterns of radiation from said source and producing a video output representing said patterns by the use of acquisition means operable in accordance with one of a plurality of selectable acquisition modes;
   (c) controlling said acquisition means for selecting said acquisition operating mode;
   (d) producing in raster format a visual image corresponding to said radiation patterns represented by said video output in response to video signals received from said acquisition means by the use of a monitor having an adjustable aspect ratio acceptance capability;
   (e) automatically adjusting the aspect ratio acceptable by said monitor as a function of which of said operating modes is selected for said acquisition means, and
   (f) adjusting the brightness of said monitor produced image as a function of the aspect ratio of the image produced by said monitor.

3. A radiation system comprising:
   (a) a source of penetrative radiation;
   (b) radiation acquisition means for detecting patterns of radiation from said source and for producing a video output representing said patterns, said acquisition means being operable in a plurality of operating modes;
   (c) a monitor including a brightness circuit and means comprising circuitry responsive to said video output to produce in raster format a visual image corresponding to said radiation patterns represented by said video output, including means for automatically adjusting the aspect ratio of said raster format image acceptable to said monitor;
   (d) circuit means for automatically adjusting the brightness of said monitor produced image as a function of said aspect ratio, said adjusting circuitry comprising means for adjusting an analog reference voltage in a portion of said brightness circuit as a function of said aspect ratio.

4. A radiographic system comprising:
   (a) a source of penetrative radiation;
   (b) multi-mode means for detecting patterns of radiation from said source in accordance with a selected one of a set of operating modes and for producing video signals representing said patterns;
   (c) means for selecting one of said predetermined set of operating modes for said multi-mode means for detecting;
   (d) a monitor including input circuit means coupled for receiving said video signals and means including a cathode ray tube for producing a visual image of said radiation pattern represented by said video signals in a raster format said monitor comprising means for automatically determining the number of lines of said raster image as a function of which of said operating modes is selected;
   (e) circuit means for automatically adjusting the brightness of said image produced by said monitor as a function substantially of the number of lines of said display image.

5. The system of claim 4, wherein:
   (a) said monitor comprises a brightness control circuit, and (b) said circuit means for adjusting said brightness comprises means for adjusting a clamp reference voltage in said monitor brightness circuit.

6. A radiographic imaging method comprising:
   (a) producing penetrative radiation and passing said radiation through an object to be imaged;
   (b) detecting patterns of radiation from said source and producing an analog video signal representing said patterns by use of a detecting means capable of operation in a plurality of operating modes;
   (c) selecting one of said operating modes for said detection means operation;
   (d) receiving said analog video signals and producing a visual image of said radiation pattern represented by said analog video signal in a raster format by the use of a monitor, the number of lines of said raster format being automatically set as a function of which of said operating modes is selected;
   (e) automatically adjusting the brightness of said monitor image in analog form as a function of the number of lines of said display image.

7. The method of claim 6, wherein said brightness adjustment step comprises selectively adjusting a clamp reference voltage in a brightness circuit of said monitor.

* * * * *